April 1, 1969     J. B. SNEED     3,435,982

FREESTANDING CONTAINER

Filed July 31, 1967

INVENTOR.
JOHN B. SNEED
BY Freeman & Taylor
ATTORNEYS

United States Patent Office 3,435,982
Patented Apr. 1, 1969

3,435,982
FREESTANDING CONTAINER
John B. Sneed, 505 Lucy St., Akron, Ohio 44306
Filed July 31, 1967, Ser. No. 657,203
Int. Cl. B65d 7/42, 25/28, 21/00
U.S. Cl. 220—70                                      1 Claim

ABSTRACT OF THE DISCLOSURE

A freestanding container having a substantially rectangular horizontal configuration and a recessed cylindrical concave bottom surface forming gripping areas adjacent the point of juncture of the ends of the cylindrical portion with the parallel side walls. The side walls tapering from the top to bottom to facilitate nesting of several similar containers.

Background of the invention

This invention relates to the field of containers and in particular to a container which is easily handled and has the ability to stand on its bottom and can be nested with other similar containers for storage.

Description of the prior art

No pertinent prior patent art is known at this time to applicant.

Summary of the invention

In the rubber industry as in other industries, the various grades and types of rubber are compounded by mixing various chemicals with natural or synthetic rubber to achieve the desired characteristics in the finished product.

At the present time, the chemicals are delivered to the site of mixing in relatively large containers. They are then transferred to smaller containers which are at the present time generally square metal containers which are then weighed to insure that the proper amount of chemical has been measured. The chemicals are then dumped into the mixing unit.

Also, in many instances, the chemicals involved are handled in paper bags which have the disadvantage that at the bottom of the bags there are generally overlapped areas where the bag is formed and the chemicals have a tendency to catch in these areas and thereby preventing complete evacuation of the container.

It has been found that the existing containers used in this operation have at least two disadvantages. In the first place, they are rather difficult to handle since there are no real gripping surfaces available.

In the second place, it is often difficult to entirely remove all of the chemicals when the same are being dumped into the mixture. This problem arises because of the fact that generally in order to have the containers capable of "freestanding" they have rectangular bottoms which, of course, include corners where the walls and bottom come together and the chemicals do have a tendency to cake in these areas.

It has been discovered that by providing a container with a generally rectangular horizontal configuration with a recessed cylindrical bottom that the above disadvantages can be obviated. In this regard, a generally rectangular horizontal configuration of the walls permits freestanding while the cylindrical configuration of the recessed area insures that all of the material will fall out of the container when it is used since the corners and cracks which normally cause difficulty have been eliminated.

It has also been discovered that by recessing the cylindrical bottom that gripping portions are provided adjacent the area of juncture between the cylindrical portion and the side walls.

It has further been found that by tapering the side walls inwardly from top to bottom that the container is capable of being nested with similar containers for storage purposes.

Accordingly, production of a container having the above noted characteristics becomes the principal object of this invention with other objects thereof becoming more apparent upon a reading of the following brief specifications, considered and interpreted in the light of the accompanying drawings.

Figure 1:
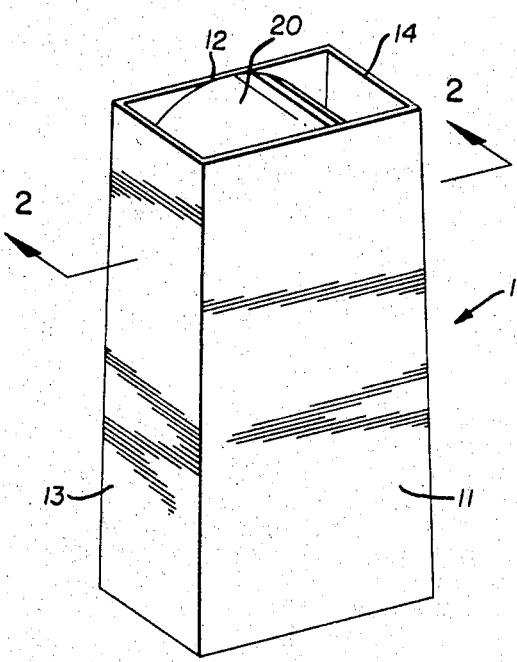
FIGURE 1 is a perspective view of the improved container.

Turning first to FIGURE 1, the container, generally designated by the numeral 10, includes front and back walls 11 and 12 and opposed side walls 13 and 14 as well as a cylindrical bottom member 20 which will be described in greater detail below. Walls 11, 12, 13 and 14 and bottom 20 combine to form an inner cavity 15 for the reception of chemicals or other loose materials.

It will be noted that the side walls 11, 12, 13 and 14 are not truly rectangular in planar configuration but in fact taper inwardly from the top 16 for example of side wall 13 to the bottom 17 thereof. This feature permits nesting of the containers with other similar containers.

Near the bottom 17 of the container is a recessed cylindrical member 20 which is shown as being integral with the side walls. In this regard, the container could be molded so as to be of one-piece construction although this is not absolutely necessary for proper functioning of the device.

Figure 2:
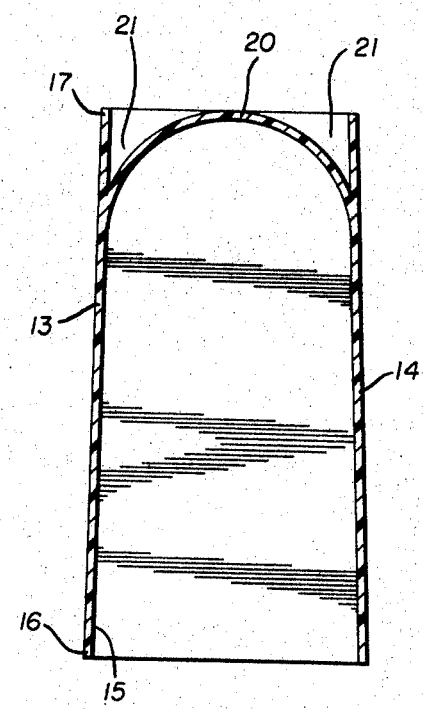
FIGURE 2 is a sectional view thereof taken on the lines 2—2 of FIGURE 1.

An examination of FIGURE 2 will show that void areas 21, 21 are provided between the bottom 17 of the container and the point of juncture between the arcuate member 20 and the side walls 13 and 14. These areas provide gripping surfaces for the hands of the user.

In use of the container, the same can be set on a floor or other surface and filed with its desired amount of chemical or other material. It is then merely necessary to grasp the same and invert it over the mixing unit. This permits the chemicals to be dumped and by grasping the side walls 13 and 14 adjacent the void areas 21, 21, it is possible to easily shake out any chemicals which might have a tendency to stick. It is also believed evident that, when not in use, a plurality of these containers can be stored in a minimum amount of space due to their nesting capabilities.

Figure 3:
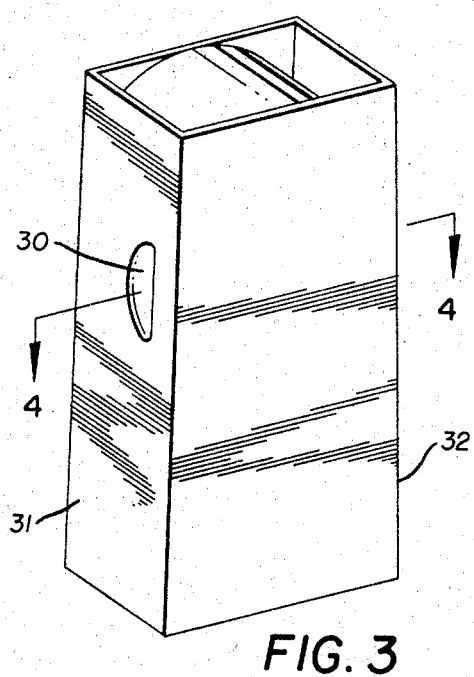
FIGURE 3 is a perspective view of a modified form of the invention.
Figure 4:
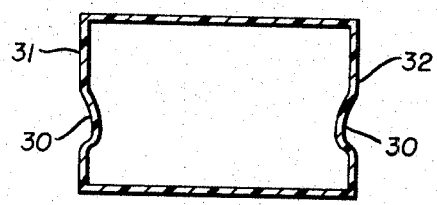
FIGURE 4 is a sectional view taken on the lines 4—4 of FIGURE 3.

Turning next to FIGURES 3 and 4 wherein a modified form of the invention is shown, it will be noted that depressed areas 30, 30 have been provided on opposed side walls 31 and 32. These depressed areas enable the user to more easily handle the container since they provide finger grip areas.

It should be noted here also that the container may be made in various ways and of various materials. For example, the same could be of one-piece molded plastic or could be constructed of metal or heavy cardboard, with all of these materials enabling the invention to be practiced as described above.

Also by utilizing such materials, a much more durable container can be provided in contrast, for example, to the paper bags commonly used at the present time which, of course, have a limited life.

It has been shown, therefore, how by providing a container having a generally rectangular horizontal configuration with a recessed cylindrical bottom area that a container can be provided which is freestanding but in which there are no corners or crevices in which material may stick.

It has further been found that by recessing the cylindrical bottom member, gripping areas are provided to facilitate shaking of the container to insure that all of its contents have been removed.

It has also been shown how, by tapering the side walls of the container from top to bottom, a plurality of similar containers can easily be stored together.

What is claimed is:

1. A freestanding container of the character described, comprising;
    (A) a pair of opposed vertically elongated side walls;
    (B) opposed front and rear vertically elongated walls interconnecting said side walls;
    (C) all of said walls tapering from a maximum width at their top edges to a minimum width at their bottom edges; and
    (D) a recessed bottom member formed of a portion of a hollow cylinder of substantially circular cross section
        (1) extending between said side walls
        (2) with the opposed straight ends of said bottom member engaging said side walls at a line spaced upwardly from the narrow ends thereof;
        (3) with the mid-line of said bottom member falling in the same plane as the bottom edges of said walls.

References Cited

UNITED STATES PATENTS

| | | | |
|---|---|---|---|
| 1,173,893 | 2/1916 | Sutcliffe | 220—70 |
| 2,013,243 | 9/1935 | Landon. | |
| 2,789,723 | 4/1957 | Perez | 220—69 X |
| 3,115,281 | 12/1963 | Somme | 220—70 X |

FOREIGN PATENTS 925,839    5/1963    Great Britain.

JOSEPH R. LECLAIR, *Primary Examiner.*

JAMES R. GARRETT, *Assistant Examiner.*

U.S. Cl. X.R.

220—94, 97